United States Patent
Yamamoto et al.

[11] Patent Number: 5,254,647
[45] Date of Patent: Oct. 19, 1993

[54] PROCESS FOR PRODUCING STYRENE-BASED POLYMERS

[75] Inventors: Koji Yamamoto; Kazutoshi Ishikawa; Hideki Imabayashi; Takashi Izumi, all of Ichihara, Japan

[73] Assignee: Idemitsu Petrochemichal Co., Ltd., Tokyo, Japan

[21] Appl. No.: 707,183

[22] Filed: May 24, 1991

Related U.S. Application Data

[63] Continuation of Ser. No. 464,936, Jan. 16, 1990, abandoned.

[30] Foreign Application Priority Data

Jan. 20, 1989 [JP] Japan ................. 1-9929

[51] Int. Cl.$^5$ ............ C08F 2/02; C08F 12/08
[52] U.S. Cl. ............ 526/65; 526/88; 526/346; 526/347; 526/347.1; 526/347.2
[58] Field of Search ........ 526/88, 347.2, 65, 346, 526/347, 347.1

[56] References Cited

U.S. PATENT DOCUMENTS

| | | | |
|---|---|---|---|
| 3,840,509 | 10/1974 | Kajimoto et al. | 526/88 |
| 3,859,268 | 1/1975 | Novack et al. | 526/65 |
| 4,105,637 | 8/1978 | Semanchik et al. | 528/241 |
| 4,115,369 | 9/1978 | Sugio et al. | 526/65 |
| 4,141,934 | 2/1979 | Wingler et al. | 526/66 |
| 4,661,570 | 4/1987 | Yamawaki et al. | 526/88 |
| 4,680,353 | 7/1987 | Ishihara et al. | 526/347.2 |

FOREIGN PATENT DOCUMENTS

| | | |
|---|---|---|
| 702146 | 1/1965 | Canada . |
| 63-178114 | 7/1988 | Japan ................. 526/65 |
| 3-80809 | 12/1991 | Japan . |

*Primary Examiner*—Joseph L. Schofer
*Assistant Examiner*—R. H. Delmendo
*Attorney, Agent, or Firm*—Oblon, Spivak, McClelland, Maier & Neustadt

[57] ABSTRACT

Disclosed is a process for producing a styrene-based polymer having syndiotactic configuration, which comprises continuously polymerizing styrene or styrene-based derivatives in a self-cleaning type reactor, while providing a sufficient shearing force to maintain a polydispersive state at a temperature of not more than 120° C.

According to the present invention, a styrene-based polymer having syndiotactic configuration can be produced efficiently and continuously, without adhesion of the polymer to the reactor and agitation blades.

10 Claims, 2 Drawing Sheets

PROCESS FOR PRODUCING STYRENE-BASED POLYMERS

This application is a continuation of application Ser. No. 07/464,936, filed Jan. 16, 1990.

BACKGROUND OF THE INVENTION

1. Field of the Invention

The present invention relates to a process for producing styrene-based polymers. More particularly, it relates to a process for an efficient, stable and continuous production of styrene-based polymers having a high degree of syndiotactic configuration.

2. Description of the Related Arts

Conventionally, styrene-based polymers having a stereostructure of atactic or isotactic configuration have been well known, but recently styrene-based polymers having a stereostructure of syndiotactic configuration have been developed, one of which, for example, is disclosed in Japanese Patent Application Laid-Open No. 187708/1987.

The styrene-based polymers having syndiotactic configuration solidify when a conversion reaches approximately 20% in the polymerization reaction, while the reaction continues until a conversion of approximately 70% is accomplished. Accordingly, if the polymerization reaction is effected in a reactor provided with agitating blades having conventional paddle blades, macro-particles with diameters of approximately 5 mm or more are formed when styrene-based polymers having a syndiotactic configuration are precipitated from the liquid-phase, and such particles lower the drying efficiency. Moreover, in the part of the reactor where the shearing force by the agitation cannot reach, these particles solidify into cakes, so that at the completion of polymerization reaction, polymer pieces remain adhered to the inner wall of the reactor, agitating blades, and objects such as thermocouples which project into the reactor.

Accordingly, almost all the processes for producing styrene-based polymers having syndiotactic configuration have heretofore been carried out by a batch system in which a tank type reactor provided with agitating blades, etc. has been used and no sufficient investigation has been done with respect to continuous polymerization techniques.

SUMMARY OF THE INVENTION

An object of the present invention is to provide a process in which polymerization can be continuously performed to produce styrene-based polymer having syndiotactic configuration.

Another object of the present invention is to provide a process, according to which the styrene-based polymer can be produced without adhering to the reactor nor solidifying into cakes.

Still another object of the present invention is to provide a process for producing the styrene-based polymer, according to which polymerization can be performed by stable running and with low power consumption.

The present invention provides a process for continuously producing a styrene-based polymer having syndiotactic configuration, which process comprises continuously polymerizing styrene or styrene derivatives in a self-cleaning type reactor while providing a shearing force sufficient to keep the resulting polymer in a polydispersive state at not more than 120° C.

BRIEF DESCRIPTION OF THE DRAWING

FIG. 1 is a cutway view,
FIG. 2 is a cross-sectional front view.

Figure 1:
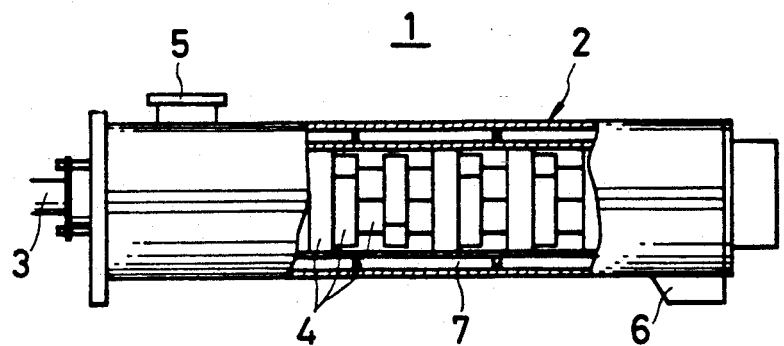
FIG. 1 and FIG. 2 illustrate the self-cleaning type reactor used in the present invention.

1: reactor, 2: cylinder, 3: rotary axis
4a: cusps, 4b: indent
5: inlet, 6: outlet
7: jacket, 8: paddle
A, A': self-cleaning type reactor
B: tank type reactor

DESCRIPTION OF THE PREFERRED EMBODIMENTS

The polymer produced in the present invention is a styrene-based polymer having high syndiotactic configuration. Therein, the high syndiotactic configuration in the styrene-based polymer means that the polymer has a stereostructure with a configuration that is highly syndiotactic, i.e., the stereostructure in which phenyl groups or substituted phenyl groups as side chains are located alternately at opposite directions relative to the main chain consisting of carbon-carbon bonds. The tacticity is quantitatively determined by the nuclear magnetic resonance method using carbon isotope ($^{13}$C—NMR method). The tacticity determined by the $^{13}$C—NMR method can be indicated in terms of proportions of structural units continuously connected to each other, i.e., a diad in which two structuralunits are connected to each other, a triad in which three structural units are connected to each other, or pentad in which five structural units are connected to each other. "Styrene-based polymers having syndiotactic configuration" of the present invention include polystyrene, poly(alkylstyrene), poly(halogenated styrene), poly(alkoxystyrene), poly(vinyl benzoate) and the mixtures thereof, and copolymers containing the above polymers as the main component, having such a syndiotacticity that the proportion of racemic diad is at least 75% and preferably at least 85%, or the proportion of racemic pentad is at least 30% and preferably at least 50%.

The above poly(alkylstyrene) includes poly(methylstyrene), poly(ethylstyrene), poly(isopropylstyrene), poly(tert-butylstyrene), and the like. Specific examples of the poly(halogenated styrene) are poly(chlorostyrene), poly(bromostyrene), poly(fluorostyrene) and the like. The poly(alkoxystyrene) includes poly(methoxystyrene), poly(ethoxystyrene) and the like. The most preferred styrene-based polymers are polystyrene, poly(p-methylstyrene), poly(m-methylstyrene), poly(p-tert-butylstyrene), poly(p-chlorostyrene), poly(m-chlorostyrene), poly(p-fluorostyrene), and a copolymer of styrene and p-methylstyrene.

The styrene-based polymers produced by the present invention generally have a weight average molecular weight of 5,000 or more, preferably 10,000 to 20,000,000, and a number average molecular weight of 2,500 or more, preferably 5,000 to 10,000,000, and have high syndiotacticity. Although the styrene-based polymer produced by the present invention is of high syndiotacticity, there can be obtained a styrene-based polymer which is of high purity and markedly high syndiotacticity, if it is washed with a solvent, e.g., methyl ethyl ketone after de-ashing treatment using a washing solution containing, e.g., hydrochloric acid, if necessary, and further rinsing and drying under reduced pressure to remove a soluble portion and the resulting insoluble portion is further treated with chloroform, for example.

The abovementioned styrene-based resin having high syndiotactic configuration can be obtained, for example, by polymerizing a styrene-based monomer (corresponding to the desired styrene-based resin, including styrene and styrene derivatives) with a catalyst comprising a titanium compound and a contact product of condensing agent and organoaluminum compound in the presence or absence of an inert hydrocarbon solvent.

Various titanium compounds can be used as the catalyst therein. A preferred example is at least one compound selected from the group consisting of titanium compounds and titanium chelate compounds represented by the general formula:

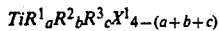

or

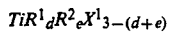

(wherein $R^1$, $R^2$ and $R^3$ are each a hydrogen atom, an alkyl group having 1 to 20 carbon atoms, an alkoxy group having 1 to 20 carbon atoms, an aryl group having 6 to 20 carbon atoms, an alkylaryl group having 6 to 20 carbon atoms, an arylalkyl group having 6 to 20 carbon atoms, an acyloxy group having 1 to 20 carbon atoms, a cyclopentadienyl group, a substituted cyclopentadienyl group or an indenyl group, $X^1$ is a halogen atom, a, b and c are each an integer of 0 to 4, and d and e are each an integer of 0 to 3).

In addition, the condensed titanium compounds represented by the general formula:

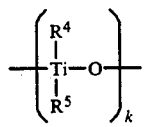

(wherein $R^4$ and $R^5$ are each a halogen atom, an alkoxy group having 1 to 20 carbon atoms, or an acyloxy group having 1 to 20 carbon atoms and k is a number of 2 to 20) can be used as the titanium compound.

These titanium compounds can be used as complexes with esters, ethers and the like.

The contact product of an organoaluminum compound and a condensing agent, which is the main component of the catalyst, as well as the abovementioned titanium compounds, is prepared by contacting an organoaluminum compound and a condensing agent.

As the above organoaluminum compound, various compounds can be applied. Usually the compounds represented by the general formula:

(wherein $R^6$ is an alkyl group having 1 to 8 carbon atoms) are used.

A typical example of the condensing agent for said organoaluminum is water. In addition, any compounds capable of undergoing a condensation reaction with organoaluminum compounds including alkylaluminum can be used.

A typical example of the contact product is a reaction product of trialkylaluminum and water, which includes chain alkylaluminoxane represented by the formula:

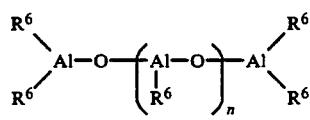

(wherein n is the polymerization degree) and cycloalkylaminoxane having the repeating unit represented by the general formula:

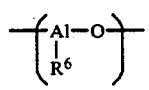

and the like.

Generally, the contact product of organoaluminum compounds such as trialkylaluminum and water includes the abovementioned chain alkylaluminoxane and cycloalkylaluminoxane, unreacted trialkylaluminum, mixture of various condensation products, and further complexedly associated molecules thereof, which become various products according to the contacting conditions of trialkylaluminum and water.

The reaction of the organoaluminum compound and water is not specified, but can be performed according to known methods; for example, (1) a method in which an organoaluminum compound is dissolved in an organic solvent and then contacted with water; (2) a method in which an organoaluminum compound is first added at the time of polymerization, and then water is added; and (3) a method in which an organoaluminum compound is reacted with water of crystallization as contained in metal salts and the like, or water absorbed on inorganic or organic compounds.

The above water may contain ammonia, amine such as ethylamine, sulfur compounds such as hydrogen-sulfide, phosphorus compounds such as phosphorous ester and so on in the proportion of less than 20%.

As a catalyst, the abovedescribed contact product can be used singly, or in combination with said organoaluminum compound or with other organometallic compounds, or can be used in the deposited or absorbed form on an inorganic substance, etc.

The amounts of the abovementioned titanium compounds and the contact product of organoaluminum compound and the condensing agent are optionally set depending on the type of styrenes (styrene or styrene derivatives) as starting material and the types of catalyst components and other conditions. As the catalyst, also other catalyst components may be added.

In the present invention, polymerization reaction is effected by agitating the starting material (styrene-based monomoer) and catalyst preferably at a temperature of lower than the melting point of the resulting polymers, that is, at a temperature of not higher than 120° C., preferably 0° to 90° C., while providing shearing force enough to maintain the polymers in a polydispersive state, so as to make a substantially solid-state polydispersoid, and thus styrene-based polymers having syndiotactic configuration are produced.

Herein agitation during polymerization reaction has three stages: i) agitation in a low viscosity state at polymerization temperature where monomers, oligomers and polymers are in liquid form, a part of polymers are in slurry form in unreacted monomers, or polymers containing other solvents are substantially in liquid like form, ii) agitation in a highly viscous state with providing shearing force, as polymerization proceeds, and iii) lastly agitation of solid-state polydispersoid when substantially the whole has become polydispersive.

Accordingly, in order to continuously produce styrene-based polymers having high syndiotactic configuration, it is desired to maintain the agitating state to an appropriate state. When almost all the reaction mixture in the reactor are in the liquid state of the above (i), the amount of unreacted monomer is so large that the amount of monomers contained in the polymers discharged from the reactor is increased and hence load of separation and recovery of the monomers is also increased, whereby production efficiency is lowered. In the highly viscous state of (ii), agitation force is increased and in an extreme case, the reaction mixture becomes gel state, causing formation of macromolecular particles or adhesion of polymers to the reactor or the agitating blades, and consequently the running becomes difficult to continue.

Abovementioned shearing force, particularly shearing force in a highly viscous state is necessary to make the reaction product solid state polydispersoid, and varies with polymerization degree or crystallinity of the polymers.

Said solid state polydispersoid means a material in dispersive state, such as powder form or flake form, and more favorably, powders having a uniform particle diameter.

In the present invention, as the means for providing the abovedescribed sufficient shearing force and for preventing the polymers from adhering to the inner wall and agitating blades of the reactor, self-cleaning type reactor is used.

The self-cleaning type reactor to be used in the present invention means a reactor (kneader) having a self-cleaning function and, in addition, kneading function. As such a self-cleaning type reactor, conventionally known ones can be used. Specific examples of such reactors are self-cleaning type kneader described in the specifications of U.S. Pat. No. 3,195,805 and No. 3,198,491. Said self-cleaning type kneaders comprise paddles fitted on two parallel axes. The paddles are in the form of Wankel rotor or biconvex with cusps, which scrape the surface of the other paddle and the inner wall of the cylinder when the paddles rotate in the same directions. In this manner kneading and self-cleaning are simultaneously performed. The kneaded material can be delivered by using screw mechanism or paddles constructed in a screw structure. Further examples of self-cleaning type kneaders are those described in Japanese Patent Application Laid-Open Nos. 54974/1985, 59824/1981, 239211/1985, 101108/1985, etc.

As the preferred type of the reactor, a self-cleaning type reactor having no opening in the upper part of paddles in the region for from starting to completing powderization (in other words, regions excluding the vicinity of inlet of the starting material and the vicinity of outlet) in the kneader, and all the portion of the inner wall of the cylinder and the surface of the paddles that contact the treating material are self-cleaned. Specific examples are parallel intermeshing biaxial kneaders including Self-cleaning type KRC Kneader manufactured by KURIMOTO, LTD. and Self-cleaning type SCR Reactor manufactured by MITSUBISHI HEAVY INDUSTRIES, LTD. Moreover, said reactor is favorably provided with a jacket to control the temperature in the cylinder, in which polymerization reaction is performed, to approximately 120° C.

In the self-cleaning type reactor to be used in the present invention, the clearance between paddles or between a paddle and the inner wall of the cylinder is favorably not more than 10 mm, more specifically, not more than 5 mm in view of controlling the particle diameter and preventing the polymer from adhering. The shearing force to be applied is, expressed in terms of the power consumption ($P[kw]$) per the capacity of the reactor ($V[l]$), favorably, $P/V \geq 0.005(kW/l)$, and most favorably in the range of 0.01 to 500. The revolution number of the paddles depends on the size of the reactor, and in usual case, favorably 5 to 500 rpm.

Figure 2:
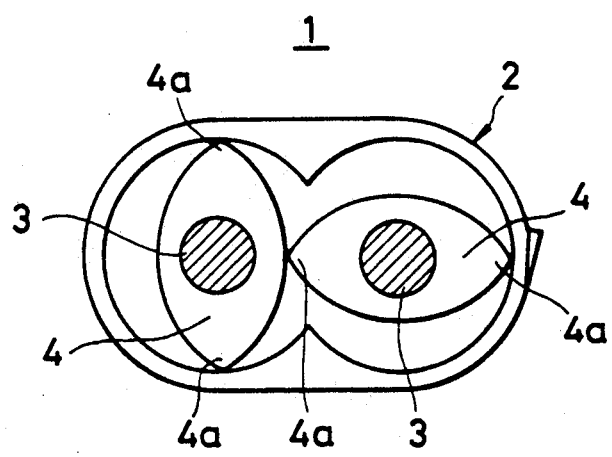

FIG. 1 and FIG. 2 illustrate an example of the abovementioned self-cleaning type reactor.

In reactor 1, two parallel rotary axes 3,3 rotating in the same direction are provided in cylinder 2 having a cross section of dumbbell shape, and said rotary axes 3,3 are fitted with many paddles 4,4 in the shape of biconvex. Paddle 4 is constructed so that its cusps 4a may scrape the inner wall of cylinder 2, and that it may form a phase difference of 90° with another paddle 4 fitted to the other rotary axis 3, and arranged in the manner that each cusp 4a may scrape the surface of the other paddle 4.

In the upper part of the one end of cylinder 2, inlet 5 for starting material is opened, and outlet 6 is opened in the lower part of the other end. Around cylinder 2, jacket 7 for controlling the temperature within cylinder 2 is provided. Inlet 5 may be opened in the lower part of one end of cylinder 2 and outlet 6 may be opened in the upper part of the other end.

If the phase of said paddles in the axis direction is arranged so as to form a spiral from the inlet 5 to outlet 6 of cylinder 2, resulting polymer can be delivered for outlet 6. Further, by varying the thickness of paddle 4 with its location in the direction of the axis, appropriate agitations suitable for liquid substance or powdery substance can be performed.

Figure 3A:
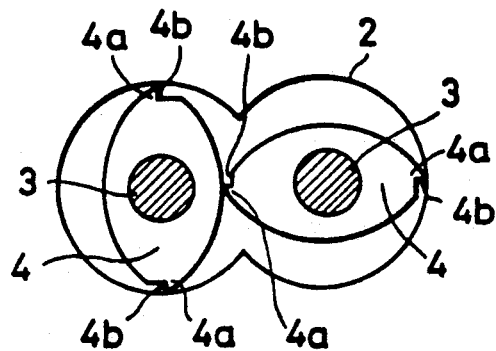
FIG. 3 is front views showing other examples of paddles.
Figure 3B:
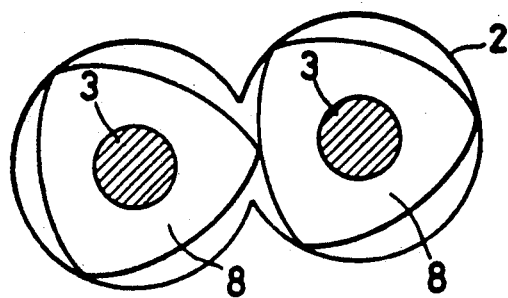

As paddle 4, in addition to the biconvex paddle mentioned above, biconvex paddles provided with indent 4b on the cusp 4a so that scraping can be efficiently performed as shown in FIG. 3 (a), and paddle 8 of Wankel rotor shape shown in FIG. 3 (b) can be used appropriately.

Figure 4A:
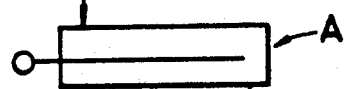
FIG. 4 is a flow chart illustrating an example of process for production.
Figure 4B:
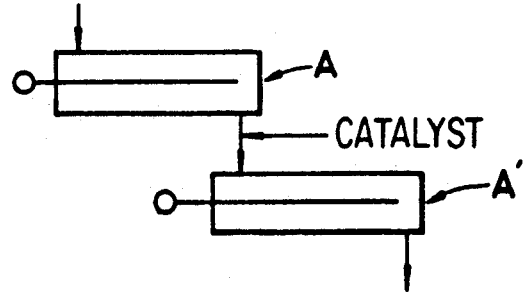
Figure 4C:
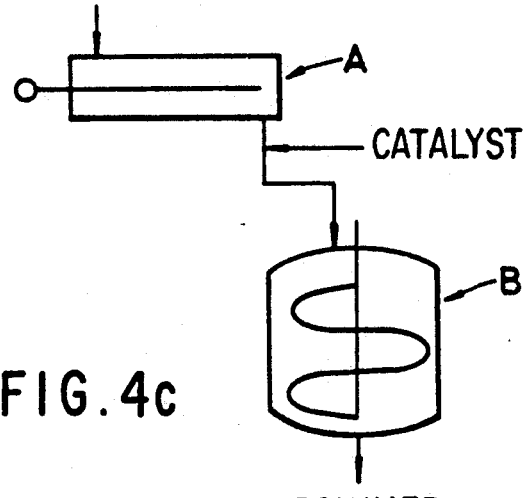

FIG. 4 illustrates an example of the process to carry out the present invention. Usually, as shown in FIG. 4 (a), polymerization can be performed solely by the use of self-cleaning type reactor A having the abovementioned structure, or two-stage polymerization can also be performed in self-cleaning type reactors A and A' having the identical structure, arranged in series as shown in FIG. 4 (b), to improve polymerization efficiency. Furthermore, as shown in FIG. 4 (c), polymerization can also be performed with the use of, in the second stage, tank-type reactor B provided with usual agitation blades such as helical blades, after the polymerization in self-cleaning type reactor A.

In case usual tank-type reactor B is arranged in the latter stage in this way, it is preferred that the agitation in liquid state to the agitation in highly viscous state while providing shearing force has been completed in self-cleaning type reactor A in the former stage, and various conditions should be set so that agitation of solid-state polydispersoid only may be performed in the tank-type reactor B in the latter stage.

As the particularly desirable conditions for agitation, polymerization is favorably carried out continuously with the self-cleaning type reactor A which is mostly occupied by solid-state polydispersoid. Such a state in the reactor can be accomplished by controlling each amount of monomers and/or catalysts fed into the reactor and the amount of resulting polymer discharged from the reactor, to adjust the ratio of the resulting polymer in the reactor to not less than 10% by weight, preferably not less than 25% by weight, more preferably 40 to 80% by weight of the total amount of the monomers and the polymers.

As described above, according to the present invention, polymerization reaction proceeds without adhesion of polymers to the reactor and agitation blades (paddles), and a styrene-based polymer having syndiotactic configuration in powder form having uniform particle diameter can be produced efficiently and continuously. Moreover, controlling the shearing force by agitation blade enables to control the particle diameter of polymers and to make the post-treatment easier. Accordingly, the present invention is expected to be utilized as a process for industrially producing a styrene-based polymer having syndiotactic configuration.

The present invention is described in greater details with reference to the following examples.

EXAMPLE 1

Self-cleaning type KRC Reactor manufactured by KURIMOTO, LTD. (no opening at upper part of the paddle, capacity: 1 liter, length of blade: 50 mm, effective length of cylinder: 660 mm, number of paddles: 35 sets, clearance between the inner wall of cylinder and the paddle: 1 mm) was used as the reactor, and the temperature inside the reactor was controlled to 70° C. by introducing hot water to the jacket, and revolution number was set to 50 rpm.

While styrene monomer was supplied to said reactor at a rate of 2 liters per hour, polymerization was performed while methylaluminoxane at a rate of 30 mmol per hour, triisobutylaluminum at a rate of 32 mmol per hour, pentamethylcyclopentadienyltitaniumtrimethoxide at a rate of 0.15 mmol per hour were supplied as the catalyst. As to the shearing force therein, the amount of power supply after deduction of ineffective power was 0.10 kW/l, and the average residence time in the reactor was about 0.5 hour.

From the outlet of the reactor, powder having an average particle diameter of 0.3 mm of styrene-based polymer having syndiotactic configuration was obtained. In the resulting polymer, no macroparticle of 5 mm or more was detected. The syndiotacticity of the polymer in terms of racemic pentad was 97%, and styrene monomer content was 60%.

Under that conditions, continuous polymerization for more than 12 hours could be carried out.

EXAMPLE 2

In addition to the same procedure as in Example 1, the powder obtained from the outlet of the self-cleaning type reactor was continuously introduced to a tank-type reactor having a inner diameter of 300 mm, and a capacity of 20 liters, provided with a double helical blade, to carry out two-stage polymerization. In that process, additionally supplied are methylaluminoxane at a rate of 15 mmol per hour, triisobutylaluminum at a rate of 17 mmol per hour, and pentamethylcyclopentadienyl-titaniummethoxide at a rate of 0.07 mmol per hour. The revolution number of the blades was set to 100 rpm, and the inner temperature was controlled to 70° C. by used of the jacket. Further, the polymer was drawn out continuously so that the average residue time in the reactor might be 5 hours.

The styrene-based copolymer powder having syndiotactic configuration continuously drawn out from the bottom of the tank has an average particle diameter of 0.3 mm, the syndiotacticity in terms of racemic pentad of 96%, and styrene monomer content of 20%.

COMPARATIVE EXAMPLE 1

In the same manner as in Example 1, polymerization was performed except that a tank type agitating reactor of a capacity of 20 liters having three paddle blades in plate form with a length of 200 mm and a width of 20 mm in a reactor having an inner diameter fo 300 mm was used in place of the self-cleaning type reactor, and styrene monomer and catalysts were continuously fed at the same rate as in Example 1. One hour after start of running, large cakes were resulted in the reactor, and running turned to be impossible.

What is claimed is:

1. A process for producing a styrenic polymer having highly syndiotactic configuration comprising a first step of preliminarily polymerizing a styrenic monomer by the use of self cleaning reactor, while applying a sufficient shearing force to maintain a polydispersive state at 120° C. or lower until the start of solid phase condition in the polymerization system and a second step of introducing the preliminarily polymerized product into a vessel reactor and proceeding with polymerization under the solid phase condition to enhance conversion to polymer.

2. The process according to claim 1, wherein a conversion to polymer of 10% or higher is attained in the first step.

3. The process according to claim 1, wherein the self cleaning reactor comprises a rotor of approximately triangular shape or of convex lens shape.

4. The process according to claim 1, wherein the temperature in the first step is maintained between 0° C. and 90° C.

5. The process according to claim 1, wherein the self-cleaning reactor is a self-cleaning kneader having paddles fitted on two parallel axes.

6. The process according to claim 5, wherein the paddles are in the form of an arcuate triangle or in the form of the shape defined by the intersection of two convex arcs.

7. The process according to claim 1, wherein the styrenic polymer having syndiotactic configuration is polystyrene, poly(alkylstyrene), poly(halogenated styrene), poly(alkoxystyrene), or copolymers containing at least one of said styrenic polymers having syndiotactic configuration as the main component; said styrenic polymers having a syndiotacticity in the racemic pentad of at least 30%.

8. The process according to claim 7, wherein the styrenic polymer is poly(methylstyrene), poly(ethylstyrene), poly(isopropylstyrene), poly(tert-butylstyrene), poly(chlorostyrene), poly(bromostyrene), poly(fluorostyrene), poly(methoxystyrene) or poly(ethoxystyrene).

9. The process according to claim 7, wherein the styrenic polymer is polystyrene, poly(p-methylstyrene), poly(m-methylstyrene), poly(p-tert-butylstyrene), poly(p-chlorostyrene), poly(m-chlorostyrene), poly(p-fluorostyrene), or a copolymer of styrene and p-methylstyrene.

10. The process according to claim 7, wherein the syndiotacticity in the racemic pentad is at least 50%.

* * * * *